United States Patent [19]
Kobayashi et al.

[11] Patent Number: 5,752,885
[45] Date of Patent: May 19, 1998

[54] TORQUE FLUCTUATION ABSORBING APPARATUS

[75] Inventors: Kiyonori Kobayashi, Chiryuu; Makoto Takeuchi, Handa; Toshiaki Katsu, Susono, all of Japan

[73] Assignees: Aisin Seiki Kabushiki Kaisha, Kariya; Toyota Jidosha Kabushiki Kaisha, Toyota, both of Japan

[21] Appl. No.: 602,282

[22] Filed: Feb. 16, 1996

[30] Foreign Application Priority Data

Feb. 17, 1995 [JP] Japan ................................. 7-029601

[51] Int. Cl.$^6$ ............................................. F16D 3/66
[52] U.S. Cl. .................. 464/68; 192/205; 192/212; 464/24
[58] Field of Search ................ 464/24, 64, 66, 464/67, 68; 192/70.17, 205, 207, 212; 74/574

[56] References Cited

U.S. PATENT DOCUMENTS

| | | | |
|---|---|---|---|
| 4,638,684 | 1/1987 | Maucher | 192/212 X |
| 4,727,970 | 3/1988 | Reik et al. | 464/68 X |
| 5,160,007 | 11/1992 | Reik et al. | 192/70.17 |
| 5,385,221 | 1/1995 | Van Maanen | 192/207 X |
| 5,415,216 | 5/1995 | Friedmann | 192/207 X |
| 5,526,714 | 6/1996 | Schierling | 192/212 |

FOREIGN PATENT DOCUMENTS 4-231758  8/1992  Japan.

*Primary Examiner*—Eileen A. Dunn
*Attorney, Agent, or Firm*—Burns, Doane, Swecker & Mathis, LLP

[57] ABSTRACT

A torque fluctuation absorbing apparatus includes a torque input member coaxially assembled with an output member through a plurality of circumferentially equally spaced resilient elements in such a manner that the resilient elements are enclosed by the torque input member and maintained in engagement with the torque input and output members to transmit input torque from the input member to the output member. The output member has a hub portion formed with a plurality of circumferentially equally spaced through holes through which a plurality of mounting bolts are inserted and threaded into a hub portion of the torque input member for connection to a drive shaft. The through holes of the output member are each formed to contain the head portion of one of the mounting bolts in such a manner as to permit relative rotaion of the torque input and output members. The through holes of the output member are each formed with an internal surface for engagement with the head portion of the respective mounting bolts in the event the resilient elements are damaged.

6 Claims, 2 Drawing Sheets

1

TORQUE FLUCTUATION ABSORBING APPARATUS

BACKGROUND OF THE INVENTION

1. Field of the Invention

The present invention relates to a torque fluctuation absorbing apparatus adapted for use, for example, between an output shaft of an internal combustion engine and an input shaft of a power transmission in an automotive vehicle.

2. Description of the Prior Art

Disclosed in Japanese Patent Laid-open Publication No. 4(1992)-231758 is a torque fluctuation absorbing apparatus of this kind which includes an input member coaxially assembled with an output member through resilient means and arranged as a unit to be applied with input torque from an internal combustion engine for transmitting the input torque to the output member therefrom. The input member is formed to enclose the resilient means, and the output member has a hub portion formed with a plurality of circumferential spaced through holes through which a plurality of mounting bolts are inserted into an annular space between the input and output members for connecting the input member to an output shaft of the engine.

In the torque fluctuation absorbing apparatus described above, the hub portions of the input and output members are annularly protruded in an opposite direction, and each head portion of the mounting bolts is placed in an annular space formed by the protruded portions of the input and output members to avoid interference of the head portion of the mounting bolt against the output member in a circumferential direction. Although in such a construction, interference of the mounting bolts can be avoided, it is impossible to enlarge the hub portions of the input and output members in thickness in a limited mounting space. It is, therefore, difficult to ensure sufficient strength of the input and output members.

SUMMARY OF THE INVENTION

A primary object of the present invention is to provide a torque fluctuation absorbing apparatus wherein the input and output members can be enlarged in thickness in an axial direction in a limited mounting space.

According to the present invention, the object is accomplished by providing a torque fluctuation absorbing apparatus including a torque input member coaxially assembled with an output member through a plurality of circumferential equally spaced resilient elements in such a manner that the resilient elements are enclosed by the torque input member, the output member having a hub portion formed with a plurality of circumferential equally spaced through holes through which a plurality of mounting bolts are inserted to be threaded into the torque input member for connection to an output shaft of a source of driving torque, wherein each head portion of the mounting bolts is placed in the respective through holes in a condition where the torque input member has been connected to the output shaft of the source of driving torque by means of the mounting bolts.

In a practical embodiment of the present invention, it is preferable that each circumferential space formed between each head portion of the mounting bolts and each internal surface of the through holes is larger in width than a circumferential space for permitting relative rotation of the torque input member and the output member.

BRIEF DESCRIPTION OF THE DRAWINGS

Other objects, features and advantages of the present invention will be more readily appreciated from the following detailed description of a preferred embodiment thereof when taken together with the accompanying drawings, in which.

DESCRIPTION OF THE PREFERRED EMBODIMENT

Figure 1:
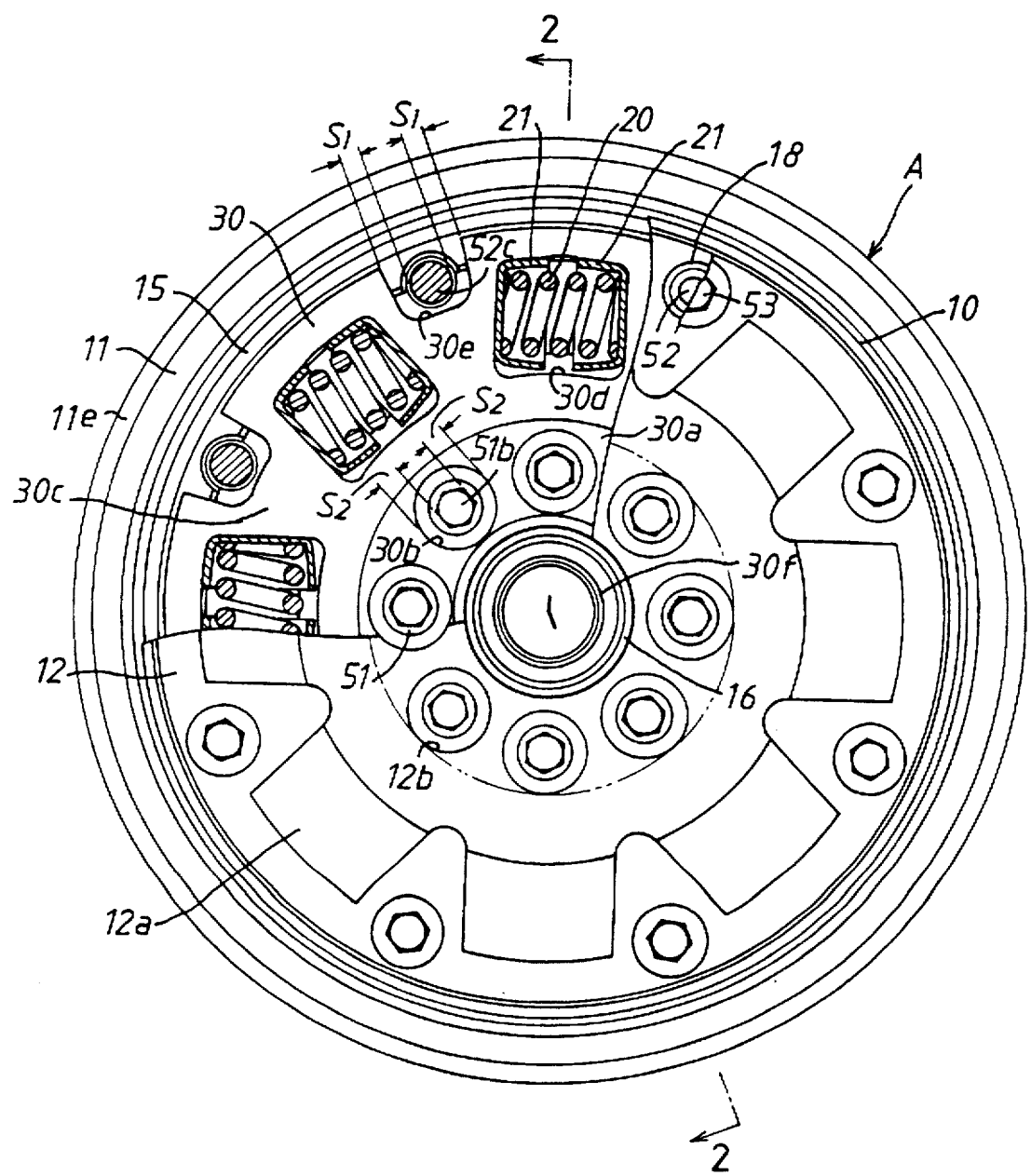
FIG. 1 is a partly broken front view of a torque fluctuation absorbing apparatus in accordance with the present invention.
Figure 2:
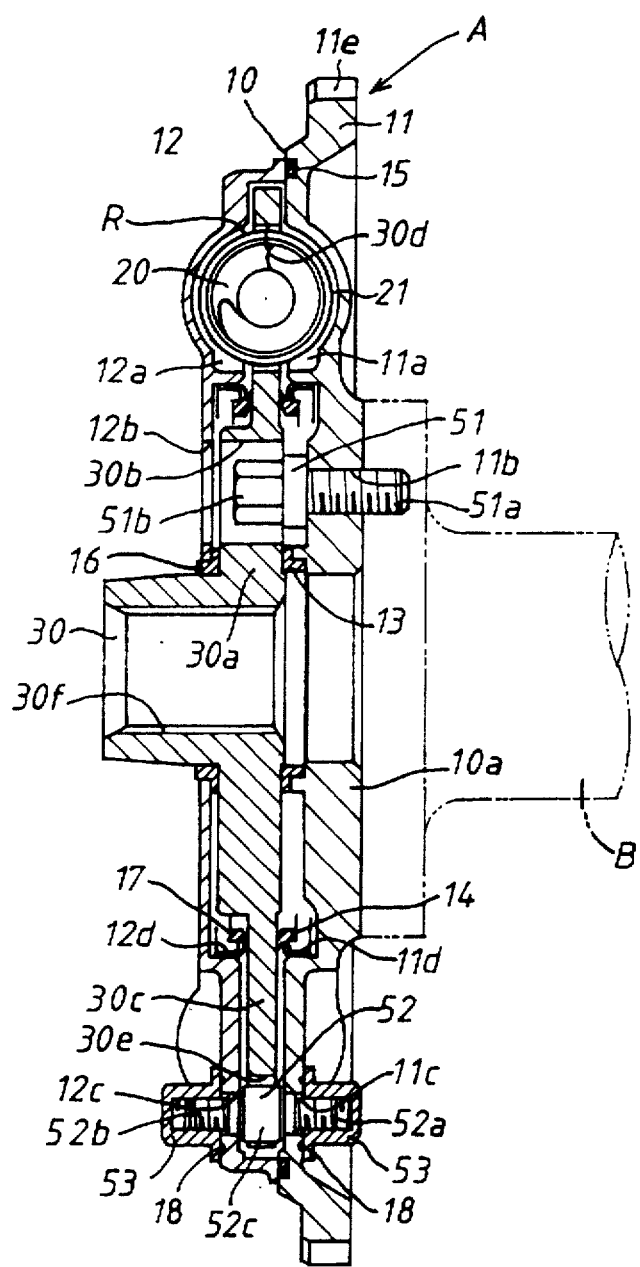
FIG. 2 is a cross-sectional view taken along line 2—2 in FIG. 1.

Illustrated in FIGS. 1 and 2 of the drawings is a torque fluctuation absorbing apparatus A of the present invention which is drivingly connected to an output shaft B of an internal combustion engine of an automotive vehicle. The torque fluctuation absorbing apparatus A includes a torque input member 10 composed of a drive plate 11 and a cover disc 12 which are coaxially assembled with an output member 30 through a plurality of circumferential equally spaced resilient elements 20 in the form of preloaded compression coil springs for transmitting input torque to the output member therefrom. The torque input member 10 is formed to enclose the resilient elements 20 and is assembled with the output member 30 as a unit.

The drive plate 11 is in the form of a flywheel of the internal combustion engine which is formed with circumferential equally spaced eight semi-cylindrical recesses 11a in which each resilient element 20 is disposed through a pair of cup-shaped retainers 21. The drive plate 11 has a hub portion formed with circumferential equally spaced eight mounting holes 11b through which mounting bolts 51 are threaded into an annular flange of output shaft B for connection to the drive plate 11 and an outer peripheral portion formed with circumferential equally spaced eight mounting holes 11c through which each threaded portion 52a of connecting bolts 52 is inserted for connecting the cover disc 12 to the drive plate 11. The drive plate 11 is provided at its inner periphery with an annular bush 13 for slidable engagement with a hub portion 30a of the output member 30 and at its annular recess lid with an annular oil seal 14 which is slidably engaged with a disc portion 30c of output member 30 at its lip portion. The outer peripheral portion of drive plate 11 is in the form of a gear 11e to be driven by a starter (not shown) of the internal combustion engine.

The cover disc 12 is connected to the drive plate 11 through an O-ring 15 by means of each pair of cap nuts 53 fastened to the threaded portions 52a and 52b of connecting bolts 52. The cover disc 12 is formed with circumferential equally spaced eight semi-cylindrical recesses 12a which correspond with the semi-cylindrical recesses 11a of drive plate 11. The resilient elements 20 are also disposed within the semi-cylindrical recesses 12a of cover disc 12 through the cup-shaped retainers 21. As shown in FIGS. 1 and 2, the cup-shaped retainers 21 are maintained in engagement with the torque input member 10 and the output member 30 under the load of the resilient elements 20 to transmit an input torque from the input member 10 to the output member 30. The cover disc 12 has an inner peripheral portion formed with circumferential equally spaced eight through holes 12b through which the mounting bolts 51 are inserted to be threaded into the mounting holes 11b of drive plate 11 and an outer peripheral portion formed with circumferential equally spaced eight mounting holes 12c through which each threaded portion 52b of the connecting bolts 52 is inserted for connecting the cover disc 12 to the drive plate 11. The cover disc 12 is provided at its inner periphery with an annular bush 16 for slidable engagement with the hub portion 30a of output member 30 and at its annular recess 12d with an annular oil seal 17 which is slidably engaged with the disc portion 30c of output member 30 at its lip portion. The cap nuts 53 are fastened to the threaded portions 52a, 52b of each connecting bolt 52 respectively through an O-ring 18. Formed between the drive plate 11 and cover disc 12 is a fluid-tight annular chamber R which is enclosed by the O-rings 15, 18 and oil seals 14, 17 and filled with an amount of lubricating medium such as grease for reducing defacement of the cup-shaped retainers 21.

The output member 30 is formed at its hub portion 30a with circumferential equally spaced eight through holes 30b which correspond with the through holes 12b of cover disc 12. The through holes 30b of hub portion 30a each are formed to accommodate each head portion 51b of the mounting bolts 51 threaded into the mounting holes 11b of drive plate 11. The disc portion 30c of output member 30 radially extending from the hub portion 30a is formed with circumferential equally spaced rectangular openings 30d in which the resilient elements 20 are retained in place by engagement with each pair of opposed retainers 21. The disc portion 30c of output member 30 has an outer peripheral portion formed with circumferential equally spaced rectangular recesses 30e in which each intermediate shaft portion 52c of the connecting bolts 52 is located to restrict relative rotation of the torque input member 10 and output member 30 by abutment against the internal surface of rectangular recess 30e. In this embodiment, a circumferential space S2 between the head portion 51b of mounting bolt 51 and the internal surface of through hole 30b is determined to be larger in a predetermined width than a circumferential space S1 between the intermediate shaft portion 52c of connecting bolt 52 and the internal surface of rectangular recess 30e. In addition, the hub portion 30a of output member 30 is formed with an internal spline 30f to be coupled with an input shaft of a clutch or torque converter (not shown).

In the torque fluctuation absorbing apparatus A as described above, input torque applied to the drive plate 11 is transmitted to the output member 30 through the retainers 21 and resilient elements 20. During transmission of the input torque, the resilient elements 20 are compressed in accordance with fluctuation of the input torque to permit relative rotation of the torque input member 10 and the output member 30 thereby to effectively absorb the fluctuation of the input torque. Such function of the resilient elements 20 is effected until each intermediate shaft portion 52c of connecting bolts 52 is brought into engagement with the internal surface of each rectangular recess 30e of the output member 30. When the torque input member 10 is applied with high input torque, the intermediate shaft portion 52c of connecting bolt 52 is engaged with the internal surface of rectangular recess 30e to transmit the input torque to the output member 30 therethrough.

In this embodiment, after the torque fluctuation absorbing apparatus A was assembled as a unit as shown in FIGS. 1 and 2, the mounting bolts 51 are threaded into the mounting holes 11b of drive plate 11 through the through holes 12b, 30b of cover disc 12 and output member 30 and threaded into the annular flange of output shaft B. Thus, the torque fluctuation absorbing apparatus A can be connected to the output shaft B in a simple manner. In a condition where the torque input member 10 has been connected to the output shaft B by means of the mounting bolts 51, each head portion 51b of the mounting bolts 51 is accommodated in the through hole 30b of output member 30, and the circumferential space S2 larger than the circumferential space S1 between the intermediate shaft portion 52c of connecting bolt 52 and the internal surface of rectangular recess 30e is formed between each head portion 51b of the mounting bolts 51 and each internal surface of through holes 30b. With such arrangement of the mounting bolts 51, the hub portions 10a, 30a of the drive plate 11 and output member 30 can be enlarged in thickness in an axial direction even if the axial mounting space is limited. This is useful to ensure sufficient strength of the drive plate 11 and output member 30.

In addition, the circumferential space S2 between the head portion 51b of mounting bolt 51 and the internal surface of through hole 30b is useful to permit relative rotation of the torque input member 10 and the output member 30 without any interference between the internal surface of through hole 30b and the head portion 51b of mounting bolt 51 in a circumferential direction. In case relative rotation of the torque input member 10 and the output member 30 is freely permitted due to damage at the engagement portions of resilient elements 20 with the torque input member 10 or the output member 30, the head portion 51b of mounting bolt 51 is brought into engagement with the internal surface of through hole 30b when relative rotation of the torque input member 10 and the output member 30 is permitted in an amount defined by the circumferential space S2. In such an instance, the mounting bolts 51 act to transmit the input torque to the output member 30 from the torque input member 10 therethrough.

Although in the above embodiment, the inner peripheral portion of cover disc 12 is formed with the through holes 12b and coupled with the hub portion 30a of output member 30 through the annular bush 16, the inner peripheral portion of cover disc 12 may be formed in a circular shape as shown by an imaginary line in FIG. 1 without the provision of the through holes 12b and annular bush 16.

What is claimed is:

1. A torque fluctuation absorbing apparatus including a torque input member coaxially assembled with an output member through resilient means in such a manner that the resilient means is enclosed by the torque input member and maintained in engagement with the torque input member and the output member to transmit input torque from the torque input member to the output member through the resilient means, said torque input member having a hub portion, said output member having a hub portion formed with a through hole through which a mounting bolt is inserted and threaded into the hub portion of said torque input member for connection to a drive shaft, the through hole in said hub portion of said output member being formed to contain a head portion of said mounting bolt in such a manner as to permit relative rotation of said torque input member and said output member, said through hole of said hub portion of said output member having an internal surface for engagement with the head portion of said mounting bolt should said resilient means become damaged.

2. A torque fluctuation absorbing apparatus as recited in claim 1, wherein a circumferential space formed between the head portion of said mounting bolt and the internal surface of said through hole is larger in a predetermined width than a circumferential space formed at an outer peripheral portion of said output member for permitting relative rotation of said torque input member and said output member.

3. A torque fluctuation absorbing apparatus as recited in claim 1, wherein the outer peripheral portion of the output member is provided with a recess in which is located an intermediate shaft portion of a connecting bolt, said circumferential space formed at the outer peripheral portion of the output member being defined between an internal surface of the recess and the intermediate shaft portion of the connecting bolt.

4. A torque fluctuation absorbing apparatus including a torque input member coaxially assembled with an output member through a plurality of circumferential equally spaced resilient elements in such a manner that the resilient elements are enclosed by the torque input member and maintained in engagement with the torque input member and the output member to transmit input torque from the torque input member to the output member through the resilient means, said torque input member having a hub portion, said output member having a hub portion formed with a plurality of circumferential equally spaced through holes through which a respective mounting bolt is inserted and threaded into the hub portion of said torque input member for connection to a drive shaft, each of the through holes in the hub portion of the output member being formed to contain a head portion of one of said mounting bolts in such a manner as to permit relative rotation of said torque input member and said output member, each of said through holes being formed with an internal surface for engaging the head portion of the respective mounting bolt contained in the through hole should said resilient means become damaged.

5. A torque fluctuation absorbing apparatus as recited in claim 4, wherein each circumferential space formed between the head portion of said mounting bolt and the internal surface of the respective through hole is larger in a predetermined width than a circumferential space formed at an outer peripheral portion of said output member for permitting relative rotation of said torque input member and said output member.

6. A torque fluctuation absorbing apparatus as recited in claim 4, wherein the outer peripheral portion of the output member is provided with a plurality of recesses in each of which is located an intermediate shaft portion of a respective connecting bolt, said circumferential space formed at the outer peripheral portion of said output member being defined between an internal surface of one of the recesses and the intermediate shaft of the respective connecting bolt.

* * * * *